Patented Dec. 9, 1952

2,621,175

UNITED STATES PATENT OFFICE 2,621,175

6,7-DICHLORO-9-(1'-D-SORBITYL)-ISOALLOXAZINE

Frederick W. Holly, Cranford, Clifford H. Shunk, Scotch Plains, and Karl Folkers, Plainfield, N. J., assignors to Merck & Co., Inc., Rahway, N. J., a corporation of New Jersey No Drawing. Application February 2, 1950, Serial No. 142,096

1 Claim. (Cl. 260—211.3)

This invention is concerned generally with novel chlorinated isoalloxazine compounds and with processes for preparing the same. More particularly, it relates to 6-chloro-9-polyhydroxyalkyl-isoalloxazines which may contain a chloro substituent in the 7-position, to processes for preparing these chlorinated isoalloxazine compounds from readily available starting materials and to intermediate products thus obtained.

These novel 6-chloro-9-polyhydroxyalkyl-isoalloxazines and their 7-chloro derivatives have the further advantageous property of absorbing ultraviolet light of certain wavelengths and are thus valuable as a base for protective creams or lotions for prevention of ultraviolet radiation damage to the skin, and consequent erethematous lesions.

These compounds are capable of absorbing oxygen under certain conditions and may be used as antioxidants. In this connection, the unique solubility properties of these polyhydroxyalkyl substituted heterocyclic nitrogen bases enable them to be used in instances where other antioxidants would not be applicable because of poor miscibility with the substances to be protected from oxidation.

The compounds, subject of the present invention, may be chemically represented as follows:

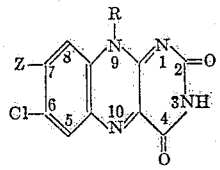

in which Z is selected from the group which consists of hydrogen and chloro radicals and R is a polyhydroxyalkyl radical. The chlorinated isoalloxazines ordinarily employed are those in which the substituent in the 9-position is a tetrahydroxy-pentyl or pentahydroxy-hexyl radical. We prefer to employ 6-chloro-isoalloxazines which may have a 7-chloro substituent and wherein the substituent in the 9-position is a polyhydroxyalkyl radical selected from the class which consists of dulcityl, xylityl, arabityl, mannityl and sorbityl radicals derived from the sugar alcohols, dulcitol, xylitol, arabitol, mannitol and sorbitol.

Examples of these novel 6-chloro-9-polyhydroxyalkyl-isoalloxazines, which may contain a 7-chloro substituent, are the following: 6-chloro-9-(1'-D-sorbityl)-isoalloxazine; 6-chloro-9-(1'-D-dulcityl)-isoalloxazine; 6-chloro-9-(1'-L-D-dulcityl)-isoalloxazine; 6-chloro-9-(1'-L-arabityl)-isoalloxazine; 6-chloro-9-(1'-D-mannityl)-isoalloxazine; 6,7-dichloro-9-(1'-D-sorbityl)-isoalloxazine; 6,7-dichloro-9-(1'-D-arabityl)-isoalloxazine; 6,7-dichloro-9-(1'-L-arabityl)-isoalloxazine; 6,7-dichloro-9-(1'-D-xylityl)-isoalloxazine; 6,7-dichloro-9-(1'-D-dulcityl)-isoalloxazine; and the like.

These chlorinated isoalloxazines can be prepared by reactions which may be chemically represented as follows:

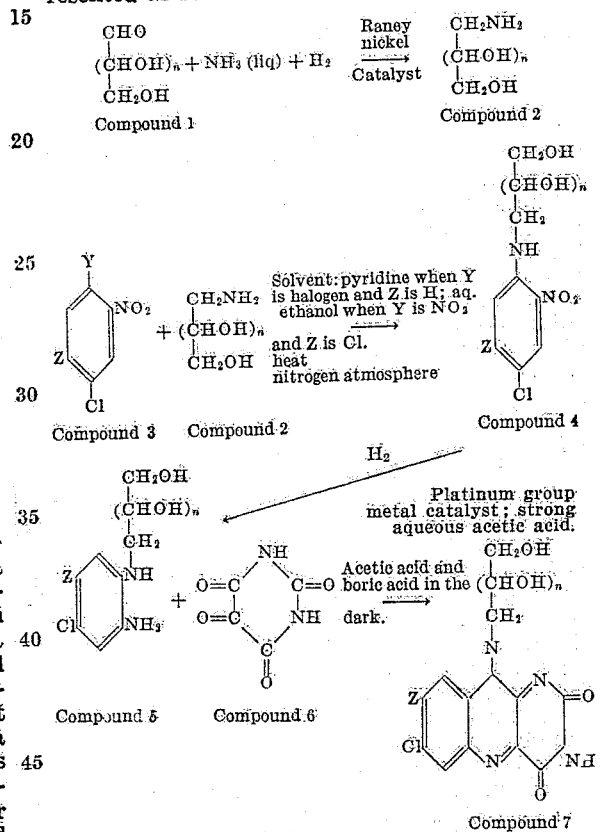

In the foregoing formulae, $n$ is 3 or 4, Z is a radical selected from the class consisting of chloro and hydrogen radicals, and Y is a radical selected from the class which consists of halogen and nitro radicals. The reactions indicated on the preceding page are conducted as follows: An aldophentose or aldohexose (compound 1) is mixed with liquid ammonia containing a small amount of water and the mixture is reacted with hydrogen in the presence of a Raney nickel catalyst to produce the corresponding glycamine (compound 2). This glycamine is then reacted with a 2-nitro-4-chlorobenzene compound containing a 1-position substituent of the class consisting of halogen and nitro radicals (i. e. ortho to 2-nitro radical), and which contains a 5-chloro radical where the 1-position substituent is nitro (compound 3), thus forming the corresponding 1 - polyhydroxyalkylamino-2-nitro-4-chlorobenzene in which the 5-position may be occupied by a chloro radical (compound 4). This 1-polyhydroxyalkylamino-2-nitro-4-chlorobenzene, which may contain a 5-chloro substituent, is then reacted with hydrogen in the presence of a hydrogenation catalyst of the platinum group, preferably palladium or platinum to produce the corresponding 1-polyhydroxyalkylamino-2-amino-4-chlorobenzene which may contain a 5-chloro substituent (compound 5). The latter compound is then reacted with alloxan (compound 6) thereby producing the corresponding 6-chloro-9-polyhydroxyalkyl-isoalloxazine, which may contain a chloro radical in the 7-position (compound 7).

In carrying out the foregoing reactions, the aldopentose or aldohexose is mixed with liquid ammonia containing a trace of water and the mixture is reacted with hydrogen at a pressure of about 1000 p. s. i. (1000 lbs. per square inch) or more using Raney nickel catalyst. After hydrogenation is complete, the ammonia is ordinarily evaporated, the residue thus obtained is mixed with water and the mixture is filtered to remove the catalyst. The glycamine is conveniently precipitated from the aqueous filtrate by the addition of methanol and can be purified, if desired, by recrystallization or reprecipitation from methanol, aqueous methanol or methanol-ether mixtures.

The reaction between the glycamine and the 2-nitro-4-chlorobenzene compound containing a halogen or nitro substituent in the 1-position (ortho to the 2-nitro radical), and which contains a 5-chloro grouping where the 1-position substituent is nitro, is accomplished according to one of two alternate procedures depending on whether the 1-position substituent is a halo or nitro radical.

The reaction between the 1-halo-2-nitro-4-chlorobenzene compound and the glycamine is conveniently carried out by heating the reactants in the presence of pyridine at the reflux temperature, and preferably in the presence of a nitrogen atmosphere whereby oxidative destruction of the product is minimized. The 1-polyhydroxyalkylamino-2-nitro-4-chlorobenzene thus obtained is recovered from the reaction mixture by conventional means and can be obtained in substantially pure form by recrystallization from aqueous methanol or ethanol.

The modification of this condensation in which the glycamine is reacted with 1,2-dinitro-4,5-dichlorobenzene, which compound contains an activated nitro group ortho to the nitro radical in the 1-position, has previously been accomplished only employing drastic conditions, as for example by heating the reactants under pressure in 80% ethanol solution at a temperature of 140° C. for a period of about 4 hours. It is now discovered that the reaction between 1,2-dinitro-4,5-dichlorobenzene and glycamines can be carried out under relatively mild conditions with the production of the desired 1-polyhydroxyalkylamino-2-nitro-4,5-dichlorobenzene in excellent yield, providing that the glycamine starting material is selected from the class which consists of glycamines derived from aldopentoses and aldohexoses in which the two hydroxyl groups adjacent to the amino group are present in the trans-position. Examples of these preferred glycamine reactants are: D-glucamine, D-xylamine, D-arabinamine, L-arabinamine and D-galactamine. In the case of glycamines in which the two hydroxy groups adjacent to the amino group are in the cis relationship to each other as in ribamine and mannamine, it has been found necessary to employ elevated temperatures up to about 140° C. under pressure in order to complete the reaction. The reaction between 1,2-dinitro-4,5-dichlorobenzene and this preferred class of glycamines can be carried out in ethanol solution at a temperature of approximately 80° C. under which conditions the reaction is ordinarily complete within a period of approximately 1 to 30 minutes.

It is now discovered that the catalytic hydrogenation of 1-polyhydroxyalkylamino-2-nitro-4-chlorobenzene compounds (which may contain a 5-chloro substituent) may be readily carried out, and without reduction of the aromatic nucleus or dehalogenation, by conducting the hydrogenation in the presence of a platinum group metal hydrogenation catalyst and employing a solvent medium comprising acetic acid diluted somewhat with water. It is desired to emphasize that the presence of some water in the acetic acid solution is critical in order that the hydrogenation proceed to completion. The hydrogenation is conveniently carried out by heating the reactants together at a temperature up to about 50° C. The intermediate 1 - polyhydroxyalkylamino-2-amino-4-chlorobenzene compound (which may contain a 5-chloro substituent) thus produced may be isolated if desired. Hydrogenation of the nitroamine in alcohol over a palladium or platinum catalyst also yields the diamine.

It is a preferred embodiment of the present discovery, however, that the intermediate 1-polyhydroxyalkylamino-2 - amino - 4 - chlorobenzene (which may contain a 5-chloro substituent) is so pure, as it is produced in the acetic acid solution, that it can be used, without purification in the subsequent reaction with alloxan. Thus, the hydrogenation mixture, after removal of the catalyst by filtration, can be used directly in the subsequent reaction with alloxan. This discovery is made the more surprising by the fact that water must necessarily be present in this hydrogenation (as emphasized hereinabove) whereas, heretofore, it had been considered essential that glacial acetic acid be used as the solvent for the reaction between o-phenylenediamines and alloxan.

The condensation of the 1-polyhydroxyalkylamino-2 - amino - 4 - chlorobenzene (which may contain a 5-chloro substituent) with alloxan is ordinarily carried out in strong acetic acid solution, preferably by mixing the hydrogenation solution, after removal of the catalyst, with a suspension of alloxan monohydrate and boric acid in glacial acetic acid. As pointed out, the fact that aqueous acetic acid can be employed as the reaction solvent is surprising and unexpected since anhydrous conditions had been previously considered necessary for this type of reaction. It is, of course, advantageous to condense the alloxan directly with the hydrogenation solution (after filtration of the catalyst) since this avoids the necessity for isolating the 2-amino-1-polyhydroxyalkylamino-4-chlorobenzene compound.

The reaction between the alloxan and the diamino compound is carried out by allowing the acetic acid solution of the reactants to stand at room temperature for a period up to approximately two days. The isoalloxazine thus formed frequently precipitates from the reaction mixture in substantially pure form during this standing period. If desired, the boric acid can be conveniently removed from the reaction mixture by repeatedly evaporating said mixture with ethanol. The recovery may also be effected by evaporating a portion of the solvent whereupon the isoalloxazine precipitates in crystalline form.

The resulting slightly impure isoalloxazine is conveniently purified by dissolving the material in strong hydrochloric acid, diluting the solution with water and allowing the solution to cool slowly. The crystalline product formed on cooling is ordinarily substantially pure. Alternatively, the isoalloxazine compound may be purified by recrystallization from water, acetic acid, or pyridine, or mixtures of water with acetic acid or pyridine.

The following examples illustrate methods of carrying out the present invention but it is to be understood that these examples are given for purposes of illustration and not of limitation.

Example 1

A mixture containing 150 g. of D-glucose, 400 ml. of liquid ammonia containing a trace of water, and about 12 g. of Raney nickel was hydrogenated at a pressure of about 2500 p. s. i. and a temperature of about 85° C. until hydrogenation was substantially complete, which required approximately 1 hour. The ammonia was evaporated, the oily residue was dissolved in 500 ml. of water, the catalyst was removed by filtration, and the the filtrate was evaporated under reduced pressure. The residual material was dissolved in aqueous methanol, the solution was cooled, and the crystalline D-glucamine which separated was collected on a filter and washed with methanol and with ether to produce 101 g. of D-glucamine, M. P. 122-126° C.

Twenty grams of D-glucamine (85% pure as determined by titration) and 50 g. of 1-iodo-2-nitro-4-chlorobenzene in 150 ml. of pyridine were heated with stirring in a nitrogen atmosphere for a period of 6 hours. The resulting solution was subjected to steam distillation to remove the pyridine and the resulting aqueous mixture was evaporated under reduced pressure. The residual material was triturated with cold water and the solid material was collected on a filter and washed with acetone to give 4.0 g. of crude 2-nitro-4-chloro-N-(1'-D-sorbityl)-aniline which was obtained as an orange colored solid, M. P. 148-150° C. This crude product was recrystallized from methanol to produce substantially pure material, M. P. 166-167° C. Anal. Calc'd for $C_{12}H_{17}N_2O_7Cl$: C, 42.8; H, 5.1. Found: C, 43.0; H, 4.8.

2-nitro-4-chloro-N-sorbityl aniline (2.7 g.) was suspended in 80 ml. of acetic acid and 20 ml. of water and the mixture was hydrogenated over 5% palladium-activated charcoal. The resulting mixture was filtered to remove the catalyst and the filtrate was added to 110 ml. of acetic acid containing 1.5 g. of alloxan monohydrate and 2.4 g. of boric acid. The resulting solution was allowed to stand at room temperature for a period of 24 hours. The solvent was evaporated under reduced pressure; two portions of ethanol were added and evaporated under reduced pressure. The residue was dissolved in hot water and the solution was allowed to cool slowly. The solid material that separated was recovered and dried under reduced pressure to give 1.8 g. of 6-chloro-9-(1'-D-sorbityl)-isoalloxazine, melting range 240-248° C. Anal. Calc'd for $C_{16}H_{17}U_4O_6Cl$: C, 46.55; H, 4.15. Found: C, 46.80; H, 4.22.

Example 2

A mixture containing 150 g. of D-galactose, 450 ml. of liquid ammonia containing a trace of water, and about 12 g. of Raney nickel catalyst was hydrogenated at a pressure of approximately 2500 p. s. i. at a temperature of 85° C. until hydrogenation was completed, which required about 1 hour. The ammonia was evaporated, the crystalline residue was dissolved in 500 ml. of water, the catalyst was removed by filtration, and the filtrate was concentrated in vacuo to a crystalline residue. This material was recrystallized from aqueous methanol to produce 101 g. of D-galactamine, M. P. 140-142° C.

Fifty grams of D-galactamine and 140 g. of 1-iodo-2-nitro-4-chlorobenzene in 300 ml. of pyridine were heated, with occasional swirling, in an oil bath for 6 hours. The resulting dark-colored mixture was subjected to steam distillation to remove the pyridine and the resulting aqueous suspension was cooled. The precipitated material was recovered and was washed with successive portions of water, ethanol, and acetone to give 16.0 g. of 2-nitro-4-chloro-N-(1'-D-dulcityl)-aniline, which was obtained in the form of fine yellow platelets, M. P. 240-246° C. (micro-block). This product was recrystallized from methanol to give substantially pure material, M. P. 244-246° C. (micro-block). Anal. Calc'd for $C_{12}H_{17}O_7N_2Cl$: C, 42.8; H, 5.1 Found. C, 43.2; H, 5.7.

Seventeen grams of 2-nitro-4-chloro-N-dulcityl aniline were suspended in a mixture of 250 ml. of acetic acid and 50 ml. of water; a 5% palladium activated charcoal catalyst was added and the mixture was hydrogenated. After the theoretical amount of hydrogen had been absorbed, the catalyst was separated by filtration and the filtrate was added to a suspension of 9.5 g. of alloxan monohydrate and 22 g. of boric acid in 760 ml. of acetic acid. The resulting mixture was allowed to stand at room temperature for 2 days. The solvent was evaporated under reduced pressure, 100 ml. of ethanol were added to the residual material, and the ethanol was evaporated under reduced pressure. The residual material was triturated with water and then purified by dissolving it in 225 ml. of hot 6N hydrochloric acid, filtering, and diluting with 325 ml. of hot water. The resulting solution was allowed to cool slowly. The crystalline precipitate which formed was collected on a filter, washed with water, and dried over phosphorus pentoxide to give 14.3 g. of 6-chloro-9-(1'-D-dulcityl)-isoalloxazine, M. P. 276-297° C. (micro-block). Anal. Calc'd for $C_{16}H_{17}N_4O_7Cl$: C, 46.6; H, 4.2; N, 13.6. Found: C, 46.4; H, 4.1; N, 13.6.

Example 3

A mixture of 150 g. of D-mannose in 450 ml. of liquid ammonia containing a trace of water was hydrogenated over about 12 g. of Raney nickel at a pressure of about 2500 p. s. i. and at a temperature of 85° C. until hydrogenation was substantially complete. The ammonia was evaporated, the residue was dissolved in water, the catalyst was removed by filtration, the filtrate was evaporated under reduced pressure, and the residual product was recrystallized from methanol to yield 150 g. of D-mannamine, M. P. 127–129° C.

A solution of 140 g. of 1-iodo-2-nitro-4-chlorobenzene in 300 ml. of pyridine was maintained at the reflux temperature under nitrogen atmosphere with continuous stirring. To the stirred solution was added portionwise, over a period of one-half hour, a suspension of 60 g. of D-mannamine in 200 ml. of pyridine. The resulting mixture was heated under reflux while maintaining the nitrogen atmosphere for a period of 6 hours. The dark-colored solution was cooled and diluted with 300 ml. of water, and the resulting solution was evaporated under reduced pressure to a volume of approximately 200 ml., whereupon a crystalline material separated. The crystalline material was recovered by filtration and washed by trituration with 800 ml. of water and then with 500 ml. of ethanol. The crystals were then washed with 200 ml. of acetone and dried to produce about 20 g. of product melting at 164–166° C. Recrystallization of these crystals from methanol gave about 18 g. of substantially pure 2-nitro-4-chloro-N-(1'-D-mannityl)-aniline; M. P. 168–169° C. By separate working up of the acetone extract there was obtained an additional 40 g. of crude 2-nitro-4-chloro-N-(1'-D-mannityl)-aniline which was obtained in the form of orange crystals, M. P. 162–166° C.

A solution containing 12 g. of 2-nitro-4-chloro-N-(1'-D-mannityl)-aniline, 250 ml. of acetic acid, and 50 ml. of water was hydrogenated over a 5% palladium-activated charcoal (Darco) catalyst. The catalyst was removed by filtration and the filtrate was added to a solution containing 4.5 g. of alloxan monohydrate, 4.5 g. of boric acid, 50 ml. of water, and 200 ml. of acetic acid, whereupon a deep yellowish-green fluorescence formed immediately. The solution was kept in the dark at room temperature for a period of 2 days, during which time there separated a crystalline deposit of 6-chloro-9-(1'-D-mannityl)-isoalloxazine which weighed about 9 g. and melted at 287–289° C. A further crop of 5 g. of the same material separated from the mother liquor. Recrystallization of this product from methanol yielded substantially pure 6-chloro-9-(1'-D-mannityl)-isoalloxazine, M. P. 289–290° C. Anal. Calc'd for $C_{16}H_{17}N_4O_7Cl$: C, 44.61; H, 4.49; N, 13.01. Found: C, 44.79; H, 4.21; N, 13.20.

*Example 4*

A mixture containing 50 g. of D-arabinose in 150 ml. of liquid ammonia containing a trace of water was hydrogenated over about 3 g. of Raney nickel at a pressure of about 2500 p. s. i. at a temperature of 85° C. The ammonia was evaporated, the residual material was dissolved in water, the catalyst was removed by filtration, and the filtrate was concentrated in vacuo to yield crude D-arabinamine, which was obtained as an oily residue. This product was used without further purification for the preparation of 2-nitro-4,5-dichloro-N-(1'-D-arabityl)-aniline.

The crude D-arabinamine, obtained in the form of an oil from 50 g. of D-arabinose as described above, was dissolved in 200 ml. of 50% ethanol and the solution was added to a solution of 30 g. of 1,2-dichloro-4,5-dinitrobenzene in 300 ml. of methanol. The mixture was heated on a steam bath for one hour, and was then allowed to stand overnight at room temperature. The crystalline product which separated was recovered by filtration, washed with ethanol and with ether, and dried in vacuo to give 31.8 g. of crude 2-nitro-4,5-dichloro-N-(1'-D-arabityl)-aniline, M. P. 226–236° C. (micro-block). Recrystallization of a sample of this crude product yielded substantially pure material, M. P. 236–238° C. (micro-block). Anal. Calc'd for $C_{11}H_{14}N_2O_6Cl_2$: N, 8.21. Found: N, 8.33.

Ten grams of crude 2-nitro-4,5-dichloro-N-(1'-D-arabityl)-aniline (M. P. 226-236° C.), prepared as described in the preceding paragraph, were dissolved in 250 ml. of acetic acid and 50 ml. of water and the solution was hydrogenated over a 5% palladium-activated charcoal (Darco) catalyst. The catalyst was removed by filtration and the filtrate was added to a solution containing 4.5 g. of alloxan monohydrate, 4.5 g. of boric acid, 50 ml. of water, and 200 ml. of acetic acid. The resulting solution was allowed to stand at room temperature in the dark for a period of about two days, the solvent was evaporated under reduced pressure, 100 ml. of ethanol was added to the residual material thus obtained, and the ethanol was evaporated from the resulting suspension under reduced pressure. The product thus obtained was washed with ethanol several times and dried in vacuo to produce 4.3 g. of crude crystalline 6,7-dichloro-9-(1'-D-arabityl)-isoalloxazine, M. P. 263–265° C. (micro-block). Recrystallization of this crude product from 18% aqueous hydrochloric acid gave 3.5 g. of substantially pure material, M. P. 267–269° C. (dec.). Anal. Calc'd for $C_{15}H_{14}N_4O_6Cl_2$: C, 43.18; H, 3.38; N, 13.43. Found: C, 42.92; H, 3.49; N, 13.22.

*Example 5*

A mixture of 150 g. of L-arabinose and 450 ml. of liquid ammonia containing a trace of water was hydrogenated over about 12 g. of Raney nickel catalyst at a pressure of about 2500 p. s. i. at a temperature of 85° C. for a period of approximately 1 hour. The ammonia was evaporated, the residual material was dissolved in water, the catalyst was removed by filtration, and the aqueous filtrate was concentrated in vacuo to produce an oil. This oil was crystallized from methanol to yield 81 g. of L-arabinamine, M. P. 96–98° C.

A solution of 60 g. of 1-iodo-2-nitro-4-chlorobenzene in 150 ml. of pyridine was heated under reflux in a nitrogen atmosphere with continuous stirring, and three 10-g. portions of L-arabinamine were added at one-hour intervals. The mixture was heated for five hours after the last addition and the resulting dark-colored mixture was subjected to steam distillation. The aqueous suspension thus obtained was cooled and the precipitated material was recovered by filtration and washed successively with water, ethanol, and acetone to give 11 g. of 2-nitro-4-chloro-N-(1'-L-arabityl)-aniline, which was obtained in the form of yellow crystals, M. P. 215–217° C. (micro-block). Recrystallization of this product gave material melting at 217–218° C. (micro-block). Anal. Calc'd for $C_{11}H_{15}N_2O_6Cl$: C, 43.1; H, 4.9. Found: C, 43.2; H, 4.5.

A suspension of 10.6 g. of 2-nitro-4-chloro-N-

(1'-L-arabityl)-aniline in 250 ml. of acetic acid and 50 ml. of water was hydrogenated over 5 g. of a 5% palladium-activated charcoal (Darco) catalyst. After hydrogenation was complete, the catalyst was removed by filtration and the filtrate was added immediately to a suspension of 6.0 g. of alloxan monohydrate and 15 g. of boric acid in 450 ml. of acetic acid. The mixture was maintained at room temperature in the absence of light for two days and was evaporated to dryness under reduced pressure. Two portions of absolute alcohol were added and the mixture was evaporated to dryness under reduced pressure after each addition. The residual material was triturated with water, filtered, and the precipitate on the filter was dissolved in 200 ml. of hot 18% aqueous hydrochloric acid and filtered. Two hundred milliliters of hot water were added to the filtrate and the solution was allowed to cool very slowly. The crystalline product which separated was recovered by filtration and dried to yield 8.7 g. of substantially pure 6-chloro-9-(1'-L-arabityl)-isoalloxazine, M. P. 276–279° C. (micro-block). Anal. Calc'd for $C_{15}H_{15}N_4O_6Cl$: C, 47.1; H, 4.0. Found: C, 46.9; H, 4.4.

*Example 6*

A mixture of 50 g. of D-xylose in 150 ml. of liquid ammonia containing a trace of water was hydrogenated over about 3 g. of Raney nickel catalyst at a pressure of about 2500 p. s. i. at a temperature of 85° C. for a period of approximately one hour. The ammonia was evaporated, the residual material was dissolved in water, the aqueous solution was filtered to remove the catalyst, and the filtrate was concentrated in vacuo to produce crude D-xylamine which was obtained in the form of an oil.

The crude D-xylamine, obtained from 50 g. of D-xylose as described in the preceding paragraph, was dissolved in 200 ml. of 50% aqueous methanol and to this solution was added a hot solution of 30 g. of 1,2-dichloro-4,5-dinitrobenzene in 300 ml. of methanol. The resulting mixture was heated on a steam bath for 1 hour and was then allowed to stand overnight at room temperature. The precipitated material was recovered by filtration, washed with ether, and recrystallized from 85% ethanol to yield 21.1 g. of 2-nitro-4,5-dichloro-N-(1'-D-xylityl)-aniline, M. P. 155–165° C. (micro-block). Anal. Calc'd for $C_{11}H_{14}N_2O_6Cl_2$: C, 38.72; H, 4.14; N, 8.21. Found: C, 38.94; H, 4.08; N, 8.46. This product was of sufficient purity for use in preparing the isoalloxazine.

A solution containing about 10 g. of 2-nitro-4,5-dichloro-N-(1'-D-xylityl)-aniline dissolved in 150 ml. of glacial acetic acid and 30 ml. of water was hydrogenated over 5 g. of a 5% palladium-activated charcoal (Darco) catalyst. The resulting mixture was filtered to remove the catalyst and the filtrate was added to a suspension of about 5.3 g. of alloxan monohydrate and 12 g. of boric acid in 300 ml. of acetic acid. The mixture was allowed to stand in the dark at room temperature for a period of 2 days and was then evaporated to dryness under reduced pressure. The residual material was slurried with ethanol, the ethanol was evaporated under reduced pressure, a second portion of ethanol was added and this ethanol was also evaporated under reduced pressure. The dried residual material was then dissolved in about 50 ml. of warm 18% aqueous hydrochloric acid, 50 ml. of water were added to the resulting solution, and the crystals which precipitated were recovered by filtration. These crystals were purified by three recrystallizations from aqueous hydrochloric acid as described above to produce approximately 5 g. of 6,7-dichloro-9-(1'-D-xylityl)-isoalloxazine, M. P. 268–274° C. (micro-block). Anal. Calc'd for $C_{15}H_{14}N_4O_6Cl_2$: C, 43.18; H, 3.38; Cl, 17.00. Found: C, 43.10; H, 3.52; Cl, 16.92.

*Example 7*

A solution of 40 g. of L-arabinamine, prepared as described in Example 5 and having a purity of 94% and 30 g. of 1,2-dinitro-4,5-dichlorobenzene in 600 ml. of 80% aqueous ethanol was heated at a temperature of 70° C. for a period of approximately 15 minutes. The solution was cooled to 3° C., and the crystalline product which precipitated was recovered by filtration, washed with methanol and with ether, and dried to produce 30 g. of 2-nitro-4,5-dichloro-N-(1'-L-arabityl)-aniline, M. P. 235–237° C. Anal. Calc'd for $C_{11}H_{14}N_2O_6Cl_2$: C, 38.73; H, 4.14; N, 8.21. Found: C, 38.76; H, 3.97; N, 8.40. An additional 7 g. was obtained by heating the filtrate for an additional 30 minute period, and then working up as described above.

A solution of 7.0 g. of 2-nitro-4,5-dichloro-N-(1'-L-arabityl)-aniline in 100 ml. of acetic acid and 20 ml. of water was hydrogenated over 5.0 g. of a 5% palladium-activated charcoal (Darco) catalyst. The resulting mixture was filtered, and the filtrate was added to a solution of 3.7 g. of alloxan monohydrate, and 8.4 g. of boric acid in 300 ml. of acetic acid. The resulting mixture was allowed to stand in the dark at room temperature for a period of approximately 24 hours, and was then evaporated to dryness under reduced pressure. The residual material was slurried with ethanol. The ethanol was evaporated under reduced pressure, an additional portion of ethanol was added, and the ethanol was again evaporated under reduced pressure. The dried residue was then dissolved in hot water and the solution was allowed to cool slowly. The solid which precipitated was recovered by filtration and was dried under reduced pressure to yield 5.9 g. of 6,7-dichloro-9-(1'-L-arabityl)-isoalloxazine, M. P. 279–293° C. (dec.) (micro-block). A sample dried in vacuo at 100° C. showed the following analysis. Calc'd for $C_{15}H_{14}N_4O_6Cl_2$: C, 43.18; H, 3.38; N, 13.43. Found: C, 42.91; H, 3.37; N, 13.41.

*Example 8*

A solution of 3.4 g. of D-glucamine, prepared substantially as described in Example 1, and having a purity of approximately 83%, and 1.8 g. of 1,2-dinitro-4,5-dichlorobenzene in 50 ml. of 80% aqueous ethanol was heated at a temperature of 70° C. for a period of approximately 2 minutes. The resulting solution was cooled rapidly to a temperature of 25° C. The crystalline material which precipitated was recovered by filtration, washed with 80% alcohol and with ether, and dried to yield 2 g. of 2-nitro-4,5-dichloro-N-(1'-D-sorbityl)-aniline, M. P. 193–196° C. Anal. Calc'd for $C_{12}H_{16}N_2O_7Cl_2$: C, 38.83; H, 4.35; N, 755. Found: C, 38.80; H, 431; N, 7.64.

Instead of carrying out the reaction as described above, the reaction may be carried out by heating the solution containing 1,2-dinitro-4,5-dichlorobenzene and D-glucamine at a temperature of 140° C. for a period of 4 hours under which conditions about the same yield of 2-nitro-4,5-dichloro-N-(1'-D-sorbityl)-aniline is obtained as that secured in the above-described procedure.

A solution of 7.0 g. 2-nitro-4,5-dichloro-N-(1'-D-sorbityl)-aniline in 120 ml. of acetic acid and 25 ml. of water was hydrogenated over 0.8 g. of a platinum oxide catalyst. The reaction mixture was filtered into a suspension of 3.7 g. of alloxan monohydrate and 8.4 g. of boric acid in 350 ml. of acetic acid. The resulting mixture was allowed to stand at room temperature for a period of 3 days and was then concentrated in vacuo to an amorphous residue. This amorphous product was dissolved in 50 ml. of 18% aqueous hydrochloric acid and 15 ml. of water was added to the resulting solution. The precipitate which formed was recovered by filtration, washed with water, and dried in vacuo to yield 5.9 g. of 6,7-dichloro-9-(1'-D-sorbityl)-isoalloxazine, M. P. 225–230° C. (micro-block). This product was recrystallized three times from 18% aqueous hydrochloric acid to yield 6,7-dichloro-9-(1'-D-sorbityl)-isoalloxazine, M. P. 237–243° C., with softening at 230° C. (micro-block). Anal. Calc'd for $C_{16}H_{16}N_4O_7Cl_2$: C, 42.97; H, 3.61; N, 12.53. Found: C, 42.86; H, 3.51; N, 12.73, 12.58.

*Example 9*

A solution containing 26 g. of D-galactamine, prepared as described in Example 2 and having a purity of approximately 83%, 15 g. of 1,2-dinitro-4,5-dichlorobenzene and 300 ml. of 80% aqueous ethanol was heated at a temperature of 80° C. for a period of one minute. A crystalline product separated and the mixture was cooled rapidly to about 0° C. The crystalline precipitate was recovered by filtration, washed with alcohol, and then with ether to yield 16 g. of 2-nitro-4,5-dichloro-N-(1'-D- dulcityl) - aniline, M. P. 222–232° C. This product was found to be satisfactory for most uses. This product was further purified by two recrystallizations from aqueous methanol to yield substantially pure 2-nitro-4,5-dichloro-N-(1'-D- dulcityl) - aniline, M. P. 236–239° C. (micro-block). Anal. Calc'd for $C_{12}H_{16}N_2O_7Cl_2$: C, 38.83; H, 4.35; N, 7.55. Found: C. 38.43; H, 3.96; N, 7.56.

A solution containing 15 g. of 2-nitro-4,5-dichloro-N-(1'-D-dulcityl)-aniline, 220 ml. of acetic acid, and 50 ml. of water was hydrogenated over about 1 g. of platinum catalyst first at room temperature and finally at a temperature of 50° C. until absorption of hydrogen ceased. The reaction mixture was filtered to remove the catalyst and the filtrate was added to a mixture containing 7.4 g. of alloxan monohydrate, 16.8 g. of boric acid and 700 ml. of acetic acid. The resulting mixture was allowed to stand in the dark overnight and was then evaporated to dryness under reduced pressure. The residual material was slurried with ethanol and the ethanol was evaporated under reduced pressure; a second portion of ethanol was added and evaporated. The dry residual product was dissolved in 80 ml. of 18% aqueous hydrochloric acid, 100 ml. of water was added to the solution, and the solution was cooled whereupon an orange crystalline precipitate separated. This precipitate was recovered by filtration and dried to produce 13.2 g. of crude 6,7-dichloro-9-(1'-D-dulcityl)-isoalloxazine. This product was recrystallized four times from aqueous hydrochloric acid to produce substantially pure 6,7-dichloro-9-(1'-D-dulcityl) - isoalloxazine monohydrate, M. P. 267–272° C. (dec.), (micro-block). Anal. Calc'd for $C_{16}H_{16}N_4O_7Cl_2 \cdot H_2O$: C, 41.30; H, 3.90; N, 12.04. Found: C, 41.31; H, 3.89; N, 11.99; 12.32.

A sample of the above hydrate was heated at 140° C. for two hours to produce substantially pure 6,7-dichloro-9-(1'-D- dulcityl) - isoalloxazine. Anal. Calc'd for $C_{16}H_{16}N_4O_7Cl_2$: C, 42.97; H, 3.61. Found: C, 43.28; H, 3.77.

*Example 10*

Fourteen and two-tenths grams of D-mannamine, prepared substantially as described in Example 3, were dissolved in the minimum quantity of hot 80% aqueous ethanol, and the solution was mixed with a solution containing 11.9 g. of 1,2-dichloro-4,5-dinitrobenzene dissolved in the minimum quantity of hot 80% ethanol, the total volume of the combined solutions being about 250 ml.

The resulting mixture was heated on a steam bath for 5 minutes under which conditions no product was obtained. Even after heating the solution under reflux overnight, only unchanged 1,2-dichloro-4,5 - dinitrobenzene separated on cooling the reaction solution. The condensation was accomplished by heating the mixture at 140° C., under nitrogen pressure in a closed vessel for a period of four hours. When the resulting solution was cooled, a product separated in the form of orange needles which were recovered by filtration, washed with ether, and dried to produce 8 g. of 2-nitro-4,5-dichloro-N-(1'-D-mannityl)-aniline, M. P. 173–177° C. (micro-block). Even after four successive recrystallizations from ethanol, a sample consistently went through a transition, with melting, to large needles at a temperature of 173–176° C., with a final melting at 177–178° C. (micro-block). Anal. Calc'd for $C_{12}H_{16}N_2O_7Cl_2$: C, 38.83; H, 4.35; N, 7.55. Found: C, 39.23; H, 4.56; N, 7.81.

A solution containing 7 g. of 2-nitro-4,5-dichloro-N-(1'-D-mannityl)-aniline, 120 ml. of glacial acetic acid, and 25 ml. of water was hydrogenated over 2 g. of a 5% palladium-activated charcoal (Darco) catalyst. The reaction mixture was filtered to remove the catalyst and the filtrate was added to a mixture containing 3.7 g. of alloxan monohydrate, 8.4 g. of boric acid and 350 ml. of glacial acetic acid. The resulting mixture was allowed to stand in the dark overnight at room temperature. The solvent was then evaporated under reduced pressure. The residual material was slurried with ethanol, the ethanol was evaporated under reduced pressure; this ethanol addition and evaporation procedure was repeated several times. The dry crystalline residue was suspended in ethanol, the suspension was filtered, and the crystalline material was washed several times with ethanol and dried in vacuo to produce 6.9 g. of crude 6,7-dichloro-9-(1'-D-mannityl)-isoalloxazine, M. P. 213–226° C. (micro-block). This product was twice recrystallized from water to produce 3 g. of 6,7-dichloro-9-(1'-D - mannityl)-isoalloxazine, M. P. 255°–265° C. (micro-block). Anal. Calc'd for $C_{16}H_{16}N_4O_7Cl_2$: N, 12.53. Found: N, 12.66.

Modifications may be made in carrying out the present invention without departing from the spirit and scope thereof. Insofar as these changes and modifications are within the purview of the annexed claims they are to be considered as part of our invention.

We claim:

6,7-dichloro-9-(1'-D-sorbityl)-isoalloxazine.

FREDERICK W. HOLLY.
    CLIFFORD H. SHUNK.
    KARL FOLKERS.

(References on following page)

REFERENCES CITED

The following references are of record in the file of this patent:

UNITED STATES PATENTS

| Number | Name | Date |
|---|---|---|
| 2,016,962 | Flint et al. | Oct. 8, 1935 |
| 2,235,938 | Lorand | Mar. 25, 1941 |

OTHER REFERENCES

Geschickter, J. A. M. A., February 1, 1930, P. O. S. L., pages 326–328.

J. A. M. A., vol. 94, No. 23, pages 1845, 1864, 1865, P. O. S. L., June 7, 1930.

Kaplan, Am. J. Cancer, January 1932, 167–78C, pages 210, 213.

Kuhn et al., Ber., V. 76 (1943), pp. 1044–1051, 8 pages.

King et al., J. C. S., 1946, pp. 681–685, 5 pages.